US009718504B2

(12) United States Patent
Klews

(10) Patent No.: US 9,718,504 B2
(45) Date of Patent: Aug. 1, 2017

(54) METHOD AND DEVICE FOR THE DRIVING STABILIZATION OF A MOTORIZED TWO-WHEELED VEHICLE USING A DOUBLE-GYROSCOPE DEVICE

(71) Applicant: Robert Bosch GmbH, Stuttgart (DE)

(72) Inventor: Matthias Klews, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 88 days.

(21) Appl. No.: 14/655,636

(22) PCT Filed: Nov. 11, 2013

(86) PCT No.: PCT/EP2013/073486
§ 371 (c)(1),
(2) Date: Jun. 25, 2015

(87) PCT Pub. No.: WO2014/106547
PCT Pub. Date: Jul. 10, 2014

(65) Prior Publication Data
US 2015/0353151 A1  Dec. 10, 2015

(30) Foreign Application Priority Data

Jan. 2, 2013  (DE) .................. 10 2013 200 020

(51) Int. Cl.
*G01C 19/02* (2006.01)
*B62D 37/06* (2006.01)
(Continued)

(52) U.S. Cl.
CPC .............. *B62D 37/06* (2013.01); *B62J 27/00* (2013.01); *B62K 11/007* (2016.11); *B62K 2207/00* (2013.01); *Y10T 74/1218* (2015.01)

(58) Field of Classification Search
CPC .......... B62D 37/06; B62D 37/00; B62J 27/00; B62K 11/007; B62K 2207/00; G05D 1/0891
See application file for complete search history.

(56) References Cited

U.S. PATENT DOCUMENTS 1,558,514 A * 10/1925 Sperry ................... B63B 39/04
                                                    74/5.37
5,820,439 A * 10/1998 Hair, III ................. A63H 17/36
                                                    446/233
(Continued)

FOREIGN PATENT DOCUMENTS

CN         1610626 A      4/2005
CN         1817725 A      8/2006
(Continued)

OTHER PUBLICATIONS

International Search Report for PCT/EP2013/073486, dated Feb. 13, 2014.

*Primary Examiner* — Jake Cook
(74) *Attorney, Agent, or Firm* — Norton Rose Fulbright US LLP; Gerard Messina

(57) ABSTRACT

In a method for driving stabilization of a motorized two-wheeled vehicle, in which two gyroscopes situated side-by-side are present having axes of rotation in parallel to each other, the gyroscopes each being tiltable about a tilting axis perpendicular to the axis of rotation, and the tilting axes of the two gyroscopes also being parallel to each other, the gyroscopes rotating about their axes of rotation in directions of rotation opposite to each other, and in the case of a detected unstable driving behavior of the two-wheeled vehicle, the two rotating gyroscopes are tilted about their respective tilting axis at a first angular velocity, the tilting directions being counter to each other; and the two gyroscopes are subsequently tilted back again at a second angular (Continued)

velocity about their respective tilting axis into their original orientation.

11 Claims, 2 Drawing Sheets

(51) Int. Cl.
  *B62J 27/00* (2006.01)
  *B62K 11/00* (2006.01)

(56) References Cited

U.S. PATENT DOCUMENTS

2008/0302194 A1* 12/2008 Elms .............. B62D 37/06
  74/5.34
2011/0231085 A1* 9/2011 Kim .............. B62D 37/06
  701/124

FOREIGN PATENT DOCUMENTS

| | | |
|---|---|---|
| EP | 0 941 914 | 9/1999 |
| GB | 980 529 | 1/1965 |
| JP | H03-69861 A | 3/1991 |
| JP | H05-13878 A | 1/1993 |
| JP | 2012 201254 | 10/2012 |
| WO | 2011/115699 A1 | 9/2011 |

* cited by examiner

METHOD AND DEVICE FOR THE DRIVING STABILIZATION OF A MOTORIZED TWO-WHEELED VEHICLE USING A DOUBLE-GYROSCOPE DEVICE

BACKGROUND OF THE INVENTION

1. Field of the Invention

The present invention relates to a method for driving stabilization of a motorized two-wheeled vehicle, in which two gyroscopes situated side-by-side are present having axes of rotation in parallel to each other.

2. Description of the Related Art

In two-track motor vehicles, systems for influencing the yaw angle in critical driving situations are widespread, and extremely effective for avoiding accidents. These systems, which are distinguished by specific and asymmetrical braking of individual wheels, do not come into consideration for two-wheel vehicles because of their design. The driving dynamics of motorcycles are greatly determined and stabilized by the gyroscopic effect of the wheels and the change in the angular momentum by steering maneuvers.

BRIEF SUMMARY OF THE INVENTION

The present invention relates to a method for driving stabilization of a motorized two-wheeled vehicle, in which two gyroscopes situated side-by-side are present having axes of rotation in parallel to each other, the gyroscopes each being tiltable about a tilting axis perpendicular to the axis of rotation; the tilting axes of the two gyroscopes also being parallel to each other, the gyroscopes rotating about their axes of rotation in directions of rotation opposite to each other, in the case of a detected unstable driving behavior of the two-wheeled vehicle, the two rotating gyroscopes being tilted about their respective tilting axis at a first angular velocity, the tilting directions being counter to each other, the two rotating gyroscopes subsequently being tilted back again about their respective tilting axis to their original orientation at a second angular velocity.

The arrangement and actuation of the gyroscopes according to the present invention provides an effective possibility for applying a specific torque onto the vehicle.

One advantageous embodiment of the present invention is characterized in that the first angular velocity is greater than the second angular velocity. The magnitude of the torque exerted on the vehicle may be specified by the specific selection of the first angular velocity. By contrast, the reverse rotation of the gyroscopes about the tilting axis should take place as slowly as possible, so that as low as possible a torque is acting on the vehicle.

One advantageous embodiment of the present invention is characterized in that the axes of rotation of the gyroscopes point in the longitudinal direction of the two-wheel vehicle, and in that the tilting axes of the gyroscopes point in the transverse direction of the two-wheel vehicle. A yawing moment is applied to the vehicle by this special configuration.

One advantageous embodiment of the present invention is characterized in that an unstable driving behavior is detected as being present if the attitude angle of the two-wheel vehicle and/or the slip angle of the rear wheel of the two-wheel vehicle exceeds a specified boundary value.

One alternative advantageous embodiment of the present invention is characterized in that an unstable driving behavior is detected as being present if the change in the attitude angle per unit of time and/or if the change in the slip angle of the rear wheel per unit of time exceed(s) a specified boundary value.

In the case of these last-named embodiments, the fact is used that large attitude angles or slip angles of the rear wheel, or great increases with time of these variables, are signs of unstable driving behavior.

One advantageous embodiment of the present invention is characterized in that, in the case of a detected unstable driving behavior, the two gyroscopes are tilted by the same angle and at the same angular velocity, but in the opposite direction. By the symmetrical tilting of the gyroscopes it is ensured that only one torque vector, lying in the plane of rotation of the gyroscopes, is created, which has no components pointing out of the rotational plane.

One advantageous embodiment of the present invention is characterized in that the two gyroscopes are identical and rotate at the same angular velocity, but in the opposite rotational direction. This ensures that the gyroscopic system, in the non-tilted basic state, has an angular momentum of zero.

One advantageous embodiment of the present invention is characterized in that the gyroscopes are driven by electric motors and are tilted by electric motors.

One advantageous refinement of the present invention is characterized by the fact that the two-wheel vehicle is a motorcycle.

In addition, the present invention includes a device having means designed for implementing the method according to the present invention. This device is in particular a control unit, which includes the program code for carrying out the method according to the present invention.

DETAILED DESCRIPTION OF THE INVENTION

In critical driving situations, in which the rear end of the motorcycle threatens to swerve, an additional torque is generated about the yaw axis, so that the motorcycle is brought back again to a state that is stable and controllable by the driver.

For this purpose, two rotationally symmetrical elements are installed in the motorcycle, which rotate at constant speed during travel. Apart from critical situations, the directions of rotation of the two gyroscopes run in parallel and in opposite directions, so that the angular moments cancel each other out, and no influencing of the driving dynamics takes place. In critical driving situations, a yaw moment is then generated, if necessary, by an appropriate twisting of the gyroscopic axes of rotation, which acts counter to a swerving of the vehicle axis.

Two gyroscope systems are installed in the motorcycle. These are each made up of a housing that is fixedly connected to the motorcycle frame, which contains a rotationally symmetrical element. The element is supported about an axis of rotation along its rotationally symmetrical axis, and after the start of the vehicle and during travel, it is accelerated about this axis, as required, by an electric motor, to a specified speed. The axes of rotation of the two gyroscopes are first in parallel, and the directions of rotation are opposite to each other, so that even when the motorcycle frame is moving, the gyroscopic effects cancel out.

The two gyroscopes are suspended rotationally about an additional axis, which runs transversely to the gyroscope directions of rotation and transversely to the frame of the motorcycle, i.e. in the motorcycle's transverse direction. The twisting about this axis also takes place by an electric motor. If the two gyroscope axes of rotation are twisted by the same angular amount, in the opposite direction about the additional axis, there comes about an angular momentum, pointing in the vertical axis direction of the vehicle, which increases with growing rotational angle.

Figure 1:
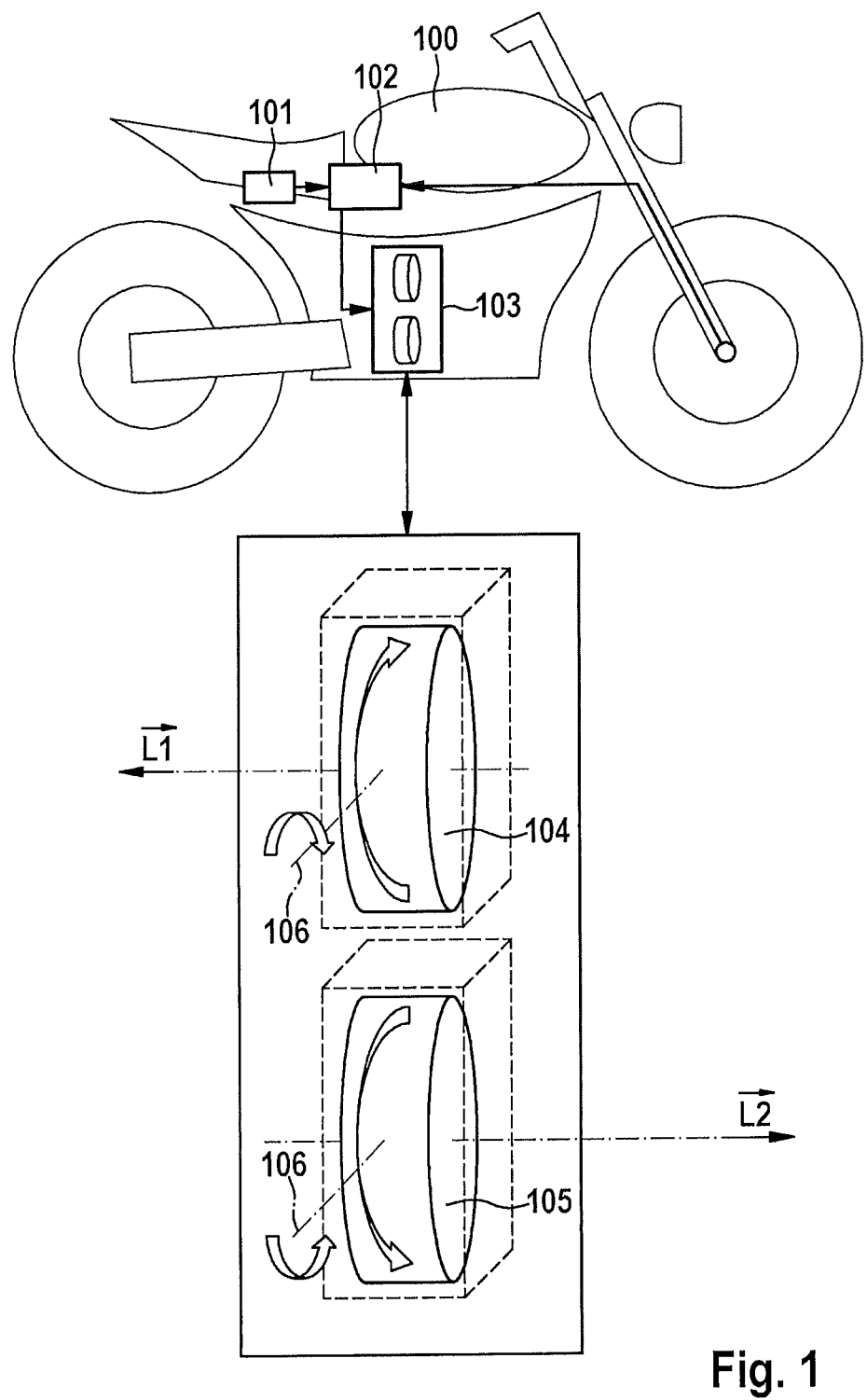
FIG. 1 shows a motorcycle having the gyroscopic system drawn in, as well as a detailed view of the gyroscopic system.

The described system is sketched in FIG. 1. At the top in that drawing, a motorcycle 100 is shown, having inertial sensors 101 and a control unit 102. Furthermore, double gyroscope system 103 is shown there, which is shown in detail at the bottom. This is made up of two gyroscopes 104 and 105, situated one above the other. Upper gyroscope 104 rotates clockwise, as seen from the front of the motorcycle, and lower gyroscope 105 rotates counterclockwise, also as seen from the front. The upper gyroscope has an angular momentum L1 pointing in the direction of the rear end of the motorcycle, and lower gyroscope has an angular momentum L2 pointing in the direction of the front end. These two angular moments cancel each other out. The two gyroscopes are additionally supported rotatably about axes 106 pointing in the motorcycle's transverse direction. When there is tilting of the rotating gyroscopes about these axes, the direction of angular moments L1 and L2 changes.

If tilting takes place about this transverse axis in the directions drawn in, L1 and L2 each receive a component pointing upwards, which add up to an angular momentum pointing upwards. During this rotational motion, a change thereby occurs, in the vertical direction, of the angular momentum per unit of time, i.e. dL/dt is unequal to zero, and thus it is a torque vector pointing in the vertical direction. This torque vector pointing in the vertical direction brings about a rotational motion of the motorcycle about its vertical axis, i.e. a yawing motion. This makes it possible to apply a desired yaw moment onto the motor cycle by a specific tilting of the gyroscopes about axes 106.

In order to detect critical situations, in which a swerving of the vehicle axis takes place, a sensor cluster of inertial sensors may be used for measuring rates of rotation and translational accelerations, and a wheel speed sensor. Using these sensor variables, one is able to estimate the vehicle's attitude angle and the slip angle of the rear wheel. In the case of motorcycles, the attitude angle typically amounts to only a few degrees at stable travel. When there is an abrupt rise in the attitude angle, one must assume a swerving vehicle axis. In this case, the control unit calculates the torque or yawing moment required to reduce the attitude angle again to typical values of a stable driving situation, and actuates the motors of the gyroscopic systems accordingly, so that this torque is provided by the gyroscopes.

After the stabilization of the driving situation, the gyroscope axes of rotation are turned back correspondingly slowly to their initial position, so that the driver senses no appreciable changes in the driving dynamics, caused by the gyroscope motion. When the gyroscopes have reached their initial position, the gyroscopic effects completely cancel out again.

Figure 2:
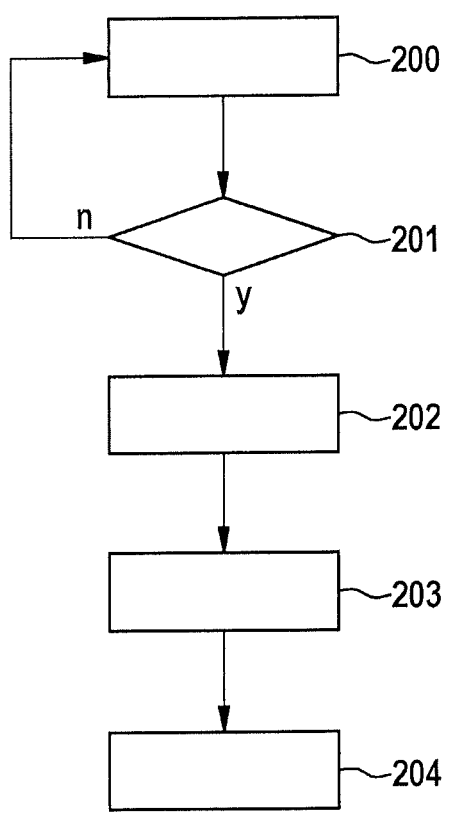
FIG. 2 shows the sequence of a specific embodiment of the method according to the present invention.

The sequence of a specific embodiment of the method according to the present invention is shown in FIG. 2. The method begins in block 200. Subsequently, in block 201, it is queried whether an unstable driving state of the two-wheel vehicle exists. If this is not the case, then a return to block 200 takes place. However, if it is the case, then in block 202 the two gyroscopes are tilted about their respective tilting axis at a first angular velocity, the tilting directions being opposite to each other. Thereafter, in block 203, the two gyroscopes are tilted back again about their respective tilting axis, at a second angular velocity to their original orientation. The method ends in block 204.

What is claimed is:

1. A method for driving stabilization of a motorized two-wheel vehicle in which two adjacently situated gyroscopes are present having axes of rotation which are parallel to each other, the gyroscopes rotating about their axes of rotation in directions opposite to each other, each of the gyroscopes being configured to be selectively tilted about a respective tilting axis perpendicular to the axis of rotation, the tilting axes of the two gyroscopes being parallel to each other, the method comprising:

prior to detecting unstable driving behavior, orienting the axes of rotation substantially parallel to a longitudinal axis of the two-wheel vehicle;

in response to detecting unstable driving behavior of the two-wheel vehicle, tilting the two gyroscopes about their respective tilting axis at a first angular velocity, the tilting directions being opposite to each other; and in response to detecting stabilization of the unstable driving behavior, subsequently tilting back the two gyroscopes about their respective tilting axis, at a second angular velocity, into their original orientation, wherein the first angular velocity is greater than the second angular velocity.

2. The method as recited in claim 1, wherein the tilting axes of the gyroscopes point in the transverse direction of the two-wheel vehicle.

3. The method as recited in claim 1, wherein an unstable driving behavior is detected as being present if one of the attitude angle of the two-wheel vehicle or the slip angle of the rear wheel of the two-wheel vehicle exceeds a specified boundary value.

4. The method as recited in claim 1, wherein an unstable driving behavior is detected as being present if one of a change in an attitude angle per unit of time or a change in a slip angle of the rear wheel per unit of time exceeds a specified boundary value.

5. The method as recited in claim 1, wherein, in the case of a detected unstable driving behavior, the two gyroscopes are tilted by a same angle magnitude and at a same angular velocity magnitude.

6. The method as recited in claim 1, wherein the two gyroscopes are identical and rotate at a same angular velocity magnitude.

7. The method as recited in claim 1, wherein the gyroscopes are driven by electric motors and are tilted using electric motors.

8. The method as recited in claim 1, wherein the two-wheel vehicle is a motorcycle.

9. A control device for driving stabilization of a motorized two-wheel vehicle in which two adjacently situated gyroscopes are present having axes of rotation which are parallel to each other, the gyroscopes rotating about their axes of rotation in directions opposite to each other, each of the gyroscopes being configured to be selectively tilted about a respective tilting axis perpendicular to the axis of rotation, the tilting axes of the two gyroscopes being parallel to each other, the control device comprising:

a control unit including a processor configured to perform the following:
- prior to detecting unstable driving behavior, orienting the axes of rotation substantially parallel to a longitudinal axis of the two-wheel vehicle;
- in response to detecting unstable driving behavior of the two-wheel vehicle, tilting the two gyroscopes about their respective tilting axis at a first angular velocity, the tilting directions being opposite to each other; and
- in response to detecting stabilization of the unstable driving behavior, subsequently tilting back the two gyroscopes about their respective tilting axis, at a second angular velocity, into their original orientation, wherein the first angular velocity is greater than the second angular velocity.

10. The method as recited in claim 1, further comprising calculating a torque or yawing moment required to reduce an attitude angle of the two-wheel vehicle to a predetermined value of a stable driving situation, wherein the tilting the two gyroscopes at the first angular velocity is configured to provide the calculated torque.

11. The method as recited in claim 1, wherein the two gyroscopes are situated one above the other.

* * * * *